Figure 1:
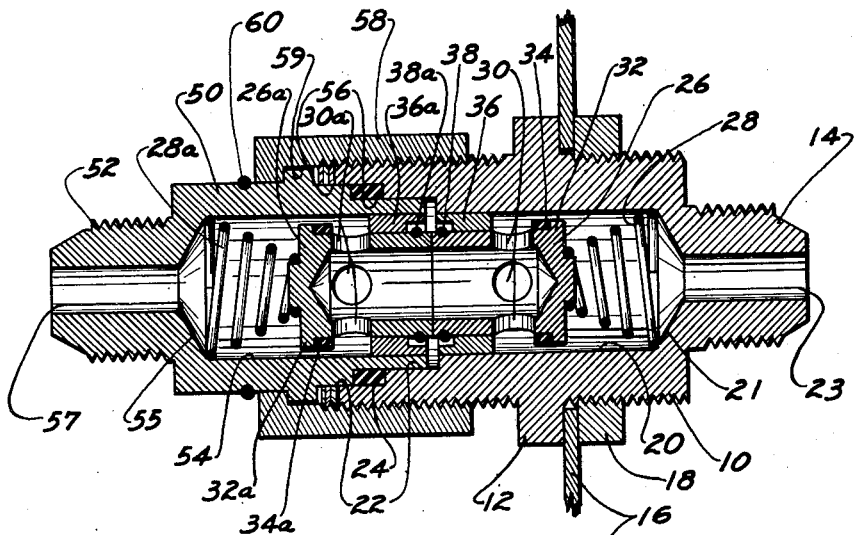

Oct. 20, 1942.  W. C. TRAUTMAN  2,299,193
COUPLING
Filed Jan. 29, 1941

INVENTOR
WALTER C. TRAUTMAN
BY
ATTORNEY

Patented Oct. 20, 1942

2,299,193

UNITED STATES PATENT OFFICE 2,299,193

COUPLING

Walter C. Trautman, Los Angeles, Calif., assignor to Bendix Aviation Corporation, South Bend, Ind., a corporation of Delaware Application January 29, 1941, Serial No. 376,462

1 Claim. (Cl. 284—19)

This invention relates to a coupling for fluid conduits, and relates more particularly to a coupling which may be used to disconnect quickly such associated conduits and which automatically seals the ends of such disconnected fluid conduits.

In the field of fluid flow whether gaseous or liquid, there are many occasions where it is desirable to disconnect portions of a conduit without losing the fluid in the conduit. Such occasions arise where apparatus employing poisonous or a valuable gas must be repaired, disassembled or otherwise operated upon. It is also important that certain gases are not diluted or contaminated by atmospheric air. In such cases a self-sealing disconnecting coupling is important.

More often perhaps a self-sealing disconnecting coupling is important in liquid flow. In many devices the admission of air to the liquid system will render the system inoperative. This is particularly true in hydraulic systems for operating and controlling devices, such as hydraulic brakes, or the hydraulic control systems of airplanes. Also it is important not to allow liquid to leak out of conduits when disconnected, such as often happens when disconnecting fuel lines, with the attendant dangers of fire.

My invention is a two-part coupling for joining the ends of fluid conduits, which coupling will seal the ends of the conduits when disconnected, but which permits the free flow of fluid when connected. My invention is characterized by its simple construction, is infallible in operation, and is readily assembled.

It is therefore an object of my invention to provide a conduit coupling which seals the ends of the conduit parts when disconnected.

It is a further object to provide a disconnecting coupling having a high flow efficiency when connected.

Another object of my invention is to provide a disconnecting coupling having seals for positive sealing action.

Still another object of my invention is to provide a disconnecting coupling having a sealing action before the final stage of disconnecting, thereby providing a margin of safety.

Another object of my invention is to provide a disconnecting coupling free from flow resistance variations under fluctuating conduit pressures.

Another object is to provide a disconnecting coupling which can be assembled by hand without the use of tools and still provide a tight connection.

Another object is to provide a disconnecting coupling having a tight valve closure regardless of the fluid pressure seating the valve.

A feature of the invention is the provision of rubber-like seals resistant to the deteriorating actions of common fuel and hydraulic fluids.

Figure 2:
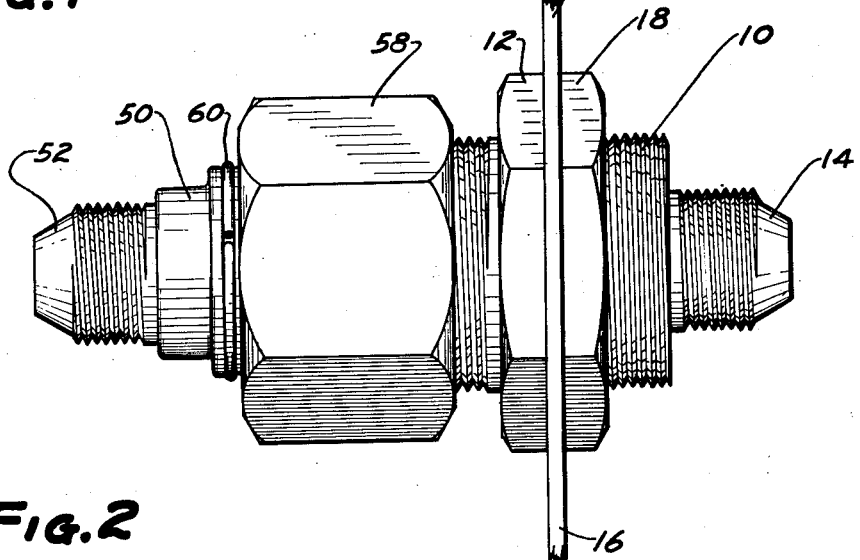

Other features and objects of the invention will be apparent in the following description and claim, which may best be understood when considered in connection with the drawing, in which:

Figure 1 is a vertical axial section through a disconnecting coupling embodying my invention, showing the coupling attached to a wall or partition; and Figure 2 is an elevation view of the disconnecting coupling shown in section in Figure 1.

The coupling which is constructed according to my invention is shown in Figure 2 as it appears in final assembly. The coupling comprises two threaded body members, a right body member 10, and a left body member 50. The right body member 10 has a reduced threaded nipple 14 on its outer end to which a fluid conduit may be attached. The left body member 50 has a reduced threaded nipple 52 on its outer end to which a fluid conduit may likewise be attached. The body member and their attached conduits are coupled together by a union nut 58, loosely held to the body member 50 by a snap ring 60 fitting in a circumferential groove in that body member. The coupling as a whole is secured to a firewall or partition 16 by an annular nut 18 threaded on body member 10 by pressing the partition 16 against an annular flange 12 on the body member 10.

The details of construction of the coupling are shown in Figure 1, and these will next be described with reference to that figure. The body member 10 contains an axial passage 20, restricted in diameter at 21 to form a smaller passage 23 for the nipple 14. The enlarged end of the body member 10 is formed with concentric steps 22 having a synthetic rubber seal 24 vulcanized in one of them. The rubber seal 24 may be of any suitable rubber-like composition having oil resistant and elastic qualities and the ability to adhere to a metal body member upon vulcanizing.

A valve unit is fitted in the opening 20 of the body member 10. This valve unit comprises a cup shaped member 26 which is inserted "bottom first" in the large end of body member 10. The member 26 is cushioned on a conical spring 28 seated on the restriction 21 of the passage 20. The cup member 26 is radially drilled near its bottom to provide valve passages 30 which are greater in cross sectional area than the cross sectional area of the nipple passage 23, to make the internal resistance of the coupling low. The bottom of cup member 26 is also formed with an external annular flange 32. A valve sealing ring 34 of elastic, oil resistant rubber is vulcanized or otherwise secured to the bottom of member 26 between passages 30 and flange 32, and abuts against flange 32. When the coupling is disconnected, the cup shaped member 26 seats against a sleeve 36, press fitted or otherwise secured in the large end of passage 20 by the contact of seal ring 34 with sleeve 36. A snap spring 38 is fitted in an external circumferential groove at the mouth of cup member 26, to prevent cup member 26 from being moved too far inwardly.

The mating part of the coupling includes the body member 50 having the nipple 52 formed at one end. The member 50 contains an axial passage 54, restricted at 55 to form a passage 57 through nipple 52. The large end of body member 50 is stepped at 56 to match the steps 22 of body member 10, but allowing ample play for the compression of seal 24 between the two body members. The two body members 10 and 50 are held together by the union nut 58 acting against an annular flange 59 on member 50 as nut 58 is threaded on member 10. The snap spring 60 fitting in an external circumferential groove on body member 50 prevents union nut 58 from becoming detached from body member 50.

A valve unit is fitted in the opening 54 of the body member 50 and shown as being identical with the valve unit of body member 10. This valve unit comprises a cup shaped member 26a which is inserted "bottom first" in the large end of body member 50. The member 26a is cushioned on a conical spring 28a seated on the restriction 55 of the passage 54. The cup member 26a is radially drilled near its bottom to provide valve passages 30a which are greater in cross sectional area than the cross sectional area of the nipple passage 57 to make the internal resistance of the coupling low. The bottom of cup member 26a is formed with an external annular flange 32a. A valve sealing ring 34a of elastic, oil resistant rubber is vulcanized or otherwise secured to the bottom of member 26a between passages 30a and flange 32a, and abuts against flange 32a. When the coupling is disconnected the cup shaped member 26a seats against sleeve 36a press fitted or otherwise secured in the large end of passage 54 by the contact of seal ring 34a with the sleeve 36a. A snap spring 38a is fitted in an external circumferential groove at the mouth of cup member 26a, to prevent cup member 26a from being moved too far inwardly.

The operation of my invention is as follows. When it is desired to disconnect a part of a fluid system or piece of tubing employing my invention, the union nut 58 is first unscrewed. Springs 28 and 28a press against cup members 26 and 26a and force the cup members 26 and 26a together separating the body members 10 and 50 as the union nut 58 is unscrewed. The threaded portion of body member 10 engaging union nut 58 is sufficiently long, however, so that cup members 26 and 26a are seated against sleeves 36 and 36a respectively before the union nut 58 is completely unscrewed. Thus both ends of the coupling are sealed before final separation, and there is no loss of fluid other than that between cups 26 and 26a.

When it is desired to assemble the coupling the body members 10 and 50 are placed against each other and union nut 58 tightened. The first few turns are free turns, and after that the cup members 26 and 26a touch and each begins to move inwardly relative to its respective body member. If one cup 26 or 26a should move more easily than the other, as would happen if one body member were under a lower fluid pressure than another, that cup would move inwardly against its spring 28 or 28a until snap spring 38 or 38a on the mouth of cup 26 or 26a contacted sleeve 36 or 36a. That cup would then cease to move inwardly any farther and the other cup member would then start to move inwardly as union nut 58 is tightened farther. The final stages of tightening union nut 58 causes both cups 26 and 26a to be pushed inwardly as shown in Figure 1, allowing fluid to flow through the coupling through holes 30 in cups 26. The final tightening stages also compress seal ring 24 sealing the coupling as a whole against leakage.

When the pressures acting on the coupling are low, as for example exhaust pressures, the coupling can be tightened by hand, without tools to a point where it will seal subsequent pressures of several thousand pounds. This feature is important in test work where a temporary fitting is desired, especially when the coupling is inaccessible for ready tool tightening. This feature also provides a safety factor, since it is impossible to make the coupling leak even with the most careless of assembly methods.

After the coupling is assembled and tightened fluctuating fluid pressures will not affect the operation of the valve. If pressure builds up suddenly on one side there is a tendency for cups 26 and 26a to move in response to the pressure surge to seal off the openings 30. Snap rings 38 and 38a prevent this, however, by limiting the stroke of the cups and maintaining the passage through the coupling substantially constant in cross sectional area.

The sleeves 36 and 36a, against which cups 26 and 26a respectively are seated, are shown as a press fit and as thus constructed the coupling is usually used only when the conduits connected thereto are under a low or exhaust pressure. If it is desired to make a disconnecting coupling capable of withstanding high or operating pressures, the sleeves 36 could be screwed in place or secured otherwise than by a press fit.

The use of a rubber-like material for seals on the valve members is an advantage over the normal type of poppet valve in that there is always a positive seal under all closed conditions. Even ordinary ball or steel poppet valves do not seal positively at low fluid pressures, due to the fact that the sealing action of a ball or other hard poppet valve is a direct function of the load applied to the poppet valve member. Also, the theoretical line contact of poppet valves is hardly ever a perfect contact line, but due to unevenness of the structure is usually a region of contact allowing leakage when under only small loads. A resilient surface at the valve, such as seal 34 and 34a, however, gives a positive seal even under low pressures because deformation to fill up irregularities is accomplished with small loads. Also it is important that the rubber seals are capable of being vulcanized to their valve members, as gaskets such as the aluminum and copper rings often become loose, allowing leakage.

The fact that the passages 30 and 30a in cup members 26 and 26a are greater than their respective nipple passages 23 and 57, insures low internal resistance of the unit to fluid flow. Actual tests have demonstrated that under full flow condition the losses have not been substantial.

The attachment of the disconnecting coupling to a partition or firewall is an optional matter and not a necessary part of the invention. Such a feature has its advantages where firewalls must be used, in that a fireproof passage through the wall is provided and at the same time there is no danger of chafing or otherwise injuring the conduit.

Although the invention has been described with reference to a particular embodiment thereof, it is not limited to that embodiment, nor otherwise than by the terms of the appended claim.

I claim:

For use with a support, a disconnecting coupling for connecting the ends of a pair of conduits comprising two body members substantially coaxial with the ends of the conduits and with each other and having axial passages therethrough, one of said body members having an annular flange, a cooperating annular nut to grip the support when placed between them and thereby support the coupling, one of said body members having external threads, a cylindrical nut rotatably engaging the body member other than the one having said threads and said external threads, to connect the body members, a snap spring on the body member bearing the cylindrical nut to retain the nut, the ends of the body members having cooperating coaxial steps formed therein, a ring of rubber-like material vulcanized in one of said steps for a seal, a restriction in the outer end of the passage of each of said body members, a poppet valve within each member seating on said restriction, a spring within each body member acting on the valve to seat it, a perforated sleeve secured to the outer side of each of said valves and fitting the associated restriction closely, the perforations therethrough exceeding in cross sectional area any single passage within a body member, a ring of rubber-like material vulcanized to the face of the valve between the sleeve and the periphery of the valve, and a snap ring on the outer end of each of said sleeves to limit their stroke, said sleeves contacting each other to open the valves when the coupling is made, and failing to touch each other just before the last stages of disconnection of the coupling.

WALTER C. TRAUTMAN.